A. E. C. PARIS.
AUTOMATIC BRAKE FOR MOTOR CAR TRACTORS AND HIND CARRIAGES OF ORDNANCE.
APPLICATION FILED SEPT. 25, 1917.

1,318,298.

Patented Oct. 7, 1919.
2 SHEETS—SHEET 2.

UNITED STATES PATENT OFFICE.

ARTHUR EDOUARD CLÉMENT PARIS, OF PUTEAUX, FRANCE, ASSIGNOR TO SCHNEIDER & CIE., OF PARIS, FRANCE, A LIMITED JOINT-STOCK COMPANY.

AUTOMATIC BRAKE FOR MOTOR-CAR TRACTORS AND HIND CARRIAGES OF ORDNANCE.

1,318,298. Specification of Letters Patent. Patented Oct. 7, 1919.

Application filed September 25, 1917. Serial No. 193,214.

*To all whom it may concern:*

Be it known that I, ARTHUR EDOUARD CLÉMENT PARIS, a citizen of the French Republic, and a resident of 42 Rue Gambetta Puteaux, Seine, France, have invented a new and useful Improvement in Automatic Brakes for Motor-Car Tractors and Hind Carriages of Ordnance, which invention is fully set forth in the following specification.

This invention has for its object to provide an improved apparatus for effecting the automatic braking on gradients, of motor car tractors or lorries, and of the hind carriages of ordnance drawn by a tractor, or attached to horse-drawn gun limbers. According to this invention the braking is effected without the intermediation of a gun server riding on the tractor or on the hind carriage and under conditions which are often arduous and dangerous.

The brakes proposed hitherto for this purpose appear to be all based on the same principle, namely, when the strain acting upon the pintle or yoke member changes its sense, that is to say, when the forwardly directed pulling strain changes to a rearwardly directed pulling strain, the brake comes directly and immediately into operation. This operation endures so long as the strain which has produced it; it is substantially proportional to it and ceases at the same time.

This idea leads necessarily to two defects in operation which are more or less apparent, namely:

1. The apparatus is too sensitive and operates at the slightest variations in the pulling strain, even if such variations are extremely short and are due not to gradients, but to mere inequalities of the ground.

2. Even on a continuous gradient the brake operates with alternate tightenings and untightenings.

Now, for the purpose of providing suitable conditions of traction it is necessary that the braking which is brought into operation by a rearwardly directed push or a given reaction, shall continue even when the strain changes its sense, and the tractor begins again to act gently upon the yoke member, because the traction must require a slight pulling force on down gradients.

The improved automatic apparatus for operating the brakes according to this invention fulfils those requirements. The improved apparatus is designed to effect the following results:

1. When braking has been caused by a determined reaction or rearwardly directed push, it will be maintained until the tractor commences again to exert upon the yoke member the normal tractive force for pulling the vehicle.

2. The operation of the braking is retarded in such a manner that its operation is practically unaffected by the inequalities of the ground.

The first of these results is obtained as follows:

The improved apparatus for operating the brake comprises in principle a piston working in a cylinder whereof the piston rod constitutes the push member when the brakes are tightened and the pulling member when the brakes are taken off. The said piston receives on its rear side the action of an opposing or untightening spring which keeps it normally against the front end of its cylinder. The front side of the piston is subjected automatically through a loaded valve to the action of a liquid under pressure transmitted by one of the sides of a diaphragm which is fixed to the yoke member, and is subjected on the other side to the action of a spring the tension of which is less than the load on the valve.

The second result above stated is obtained as hereinafter described by means of a peculiar construction of the diaphragm which transmits the tightening effort and insures the release of the brake.

An embodiment and mode of application of this invention is illustrated by way of example in the accompanying drawings in which.

Figure 1:
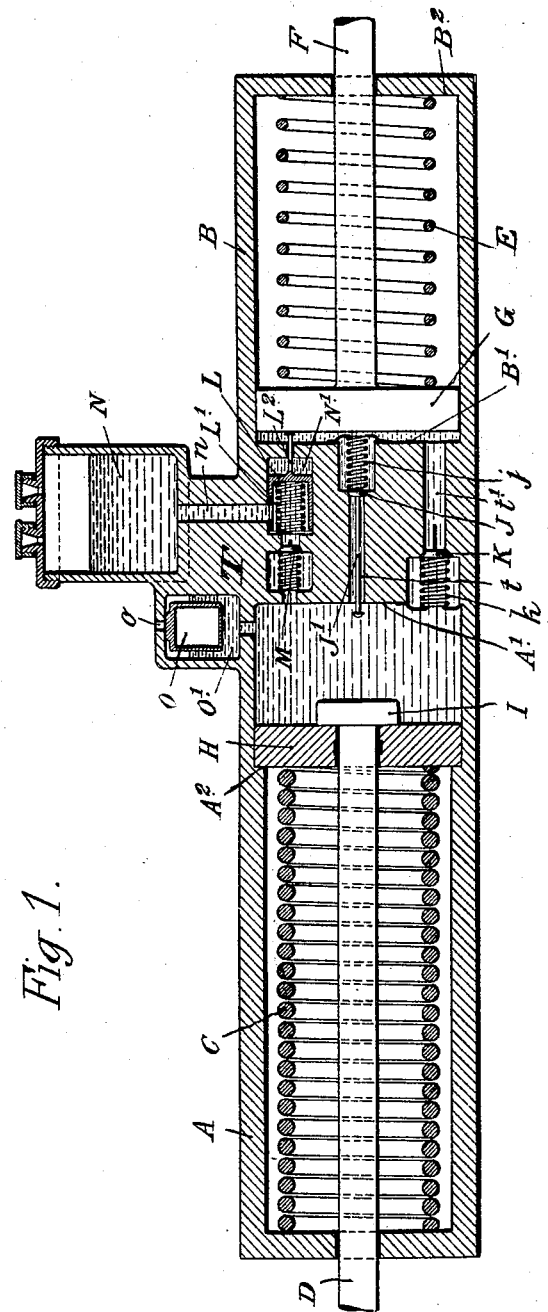
Figure 1 is a diagrammatic vertical longitudinal section of the apparatus.
Figure 2:
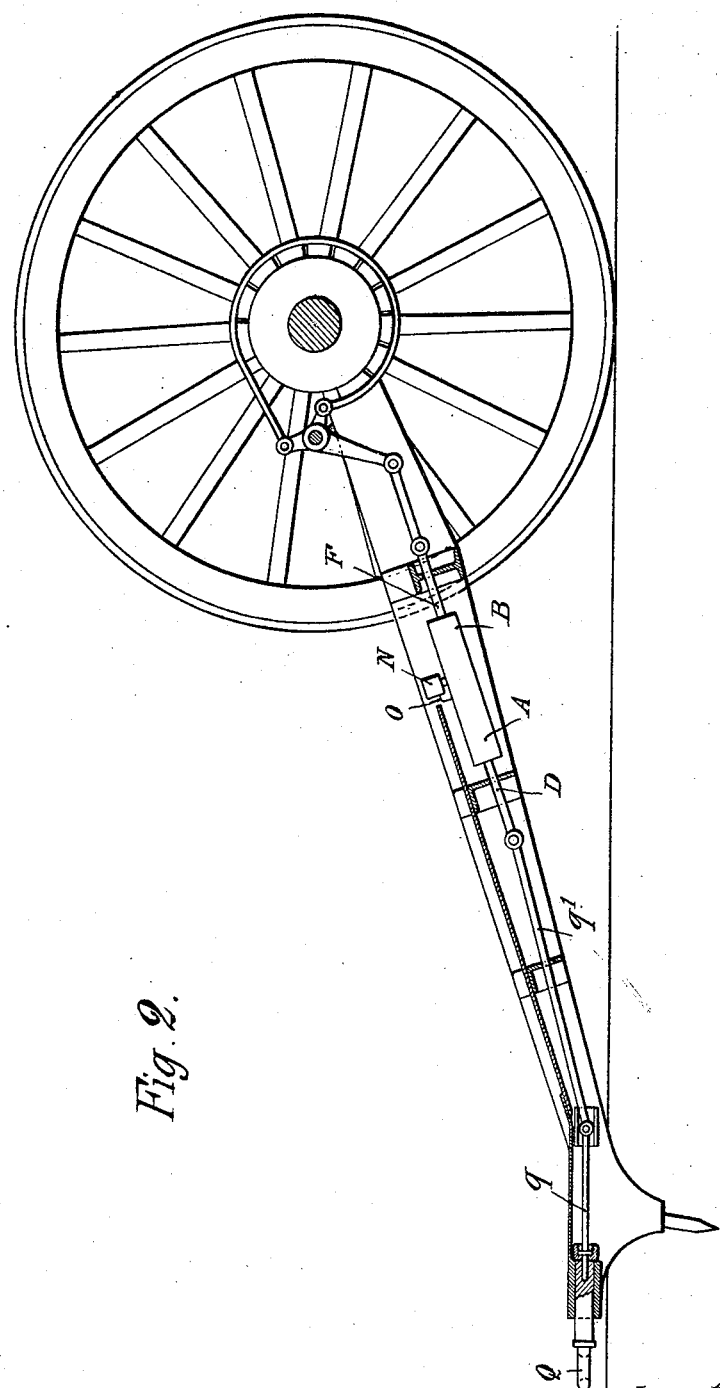
Fig. 2 is a side elevation partly in vertical section illustrating the application of the improved apparatus for braking a gun carriage drawn by a tractor.

The apparatus which is mounted on the drawn vehicle, comprises a cylinder B in which works a piston G. The rod of this piston is attached to the brake-operating device. The piston is normally kept bearing against the front end $B^1$ of the cylinder by an opposing spring E which bears at its other end against the rear end B² of the said cylinder. The tension of this spring is made such that it will produce automatically the release of the brake.

The cylinder B is connected to a second cylinder A. $t$ is a first communication duct formed in the separating partition T which may be constituted by the end of the cylinder A. In the duct $t$ there is located a valve J loaded by a spring $j$ which normally keeps it closed. In a second duct $t^1$ there is located a valve K opening from the cylinder B toward the cylinder A and acting as a non-return valve during the discharge from A toward B, and opening without effort for allowing a discharge from B toward A.

In the cylinder A there is adapted to move between a seat A² and the rear end A¹ formed by the partition T, a diaphragm H—I which is connected by a rod D to the yoke member of the tractor, such as for instance a trail eye Q. The connection between the parts Q and D comprises of course the necessary rodding $q$, $q^1$. The diaphragm is subjected on its forward side to the action of a spring C which is kept compressed by the traction upon the yoke member, in such a manner as to move the diaphragm H toward or upon its seat A².

The whole of the space comprised between the opposing sides of the diaphragm H—I and the piston G, in the cylinders A and B as well as in the ducts $t$, $t^1$, is filled with a liquid, for instance oil.

The load on the valve J is made such that it will exceed the pressure produced in the liquid by the thrust of the spring C upon the diaphragm H—I so long as this thrust is not increased by a rearwardly directed thrust acting upon the rod D.

It is to be understood that any rearwardly directed thrust acting upon the yoke member, by producing a recoil of the rod D of the diaphragm, will increase the pressure in the liquid and thus tend immediately to open the valve J, and consequently to cause the liquid under pressure to act upon the piston G, that is to say, to apply the brake.

This application of the brake will continue so long as the thrust continues which has produced it. The application of the brake will by the way continue until the pull of the tractor upon the rod D shall have brought back the diaphragm H—I upon its seat by compressing the spring C.

In practice, in order to render the operation of the brake unaffected by slight temporary thrusts produced upon the yoke member by the passage of the vehicles over inequalities of the ground, the rod D is rendered movable with relation to the diaphragm which it keeps normally bearing upon the seat A² by means of a head I. The rod D—I can thus slide in the diaphragm in its reëntrant movements, but it will necessarily carry the diaphragm with it in its outward movements. It is to be understood that a slight thrust will cause the rod D—I to move immediately without carrying with it the diaphragm H. The quantity of liquid that is thereby displaced, and consequently the application of the brake will become appreciable only when the diaphragm H shares this movement by the action of the expansion of the spring C.

With the improved apparatus, it is for instance possible to arrange that the brake shall come into operation when a pressure $p$ (of say 2 to 3 kgs.) shall be exerted upon the rod D through the medium of the yoke member, and to maintain the brake in its operative position so long as the pull upon the rod D shall not exceed the value P of the normal pull (about 20 kgs. per ton) on an ordinary road.

Let R be the total effort of the spring C; and $r$ the total effort of the spring E, calculated in such a manner that R—$r$=P; let S be the total section of the diaphragm H and rod D, and $s$ the total section of the rod D.

If no effort is exerted upon the rod D the pressure of the liquid will be: $\frac{R}{S}$ This pressure will increase when a thrust is exerted upon D.

The valve J is loaded in such a manner as to withstand the pressure $\frac{R}{S}$ and yield to a pressure $$\frac{R}{S}+\frac{p}{s}.$$

At rest, and when in traveling the effort exerted upon D is a pull or push less than $p$, the valve J will remain closed and the brake will not operate. When the pressure exerted upon D reaches the value $p$, the valve J will yield and the brake will commence to operate.

The diaphragm H pushed by its spring C follows this movement and allows a quantity of liquid to pass into B which is sufficient to produce an appreciable movement of the piston G. If the diaphragm did not immediately follow the movement of the head I of the rod D, said head in arriving at the end of its stroke would bear against an extension J¹ of the valve J, and thereby keep it open and thus allow the body of the diaphragm H to advance in its turn.

As the section $s$ is small, sudden movements of the rod D will produce only an unappreciable amount of braking. In order to brake really, it is necessary that the pressure $p$ shall continue for a sufficient time to allow of the discharge of the oil forced out by the diaphragm H. The velocity of this discharge may be regulated by the cross section of the valve J.

The application of the brake will in any case cease as soon as the valve J is closed, that is to say, as soon as the thrust upon the yoke member will become less than $p$. Once the brake has been applied it will remain so applied so long as the oil cannot flow back from B into A, that is to say, so long as the diaphragm has not been returned toward the left by a pull greater than R—$r$.

The rapidity of the operation of the apparatus will depend only on the cross sections of the valves and may be regulated at will.

The improved apparatus may comprise the accessory devices shown in Fig. 1, namely:

1. A filling device for making up any loss of oil.

A store of oil is contained in a reservoir N which may be formed on the cylinders A and B. This reservoir communicates through a duct $n$ with a chamber N formed in the partition T or in the end of the cylinder B. Communication between $n$ and N is closed normally by a valve such as a plug valve L subjected to the action of a spring L¹. This communication is opened only as the result of the compression of the spring L¹, produced by the thrust of the piston G moved back by the spring E, upon a rod L² carried by the said plug L. In this manner no untimely return of the liquid can take place before the piston G has returned completely to the end of its stroke. A non-return valve M prevents any liquid from returning from A into the reservoir N.

2. An air escape device is located on the cylinder A. It consists simply of a small hole $o$ closed by a float valve O. The hole is closed so long as the chamber $o^1$ containing the float is filled with oil, and it is opened when the level of the oil sinks.

What I claim is:—

1. In apparatus for the automatic operation of brakes for drawn vehicles, the combination of a brake cylinder, a spring-pressed piston working therein adapted to be connected to a brake and normally holding the latter out of braking position, a second cylinder, a spring-pressed diaphragm therein having a traction rod, a passage for transfer of fluid between said cylinders, a spring-pressed valve therein normally holding the valve closed against fluid pressure in opposition to the tension of said diaphragm spring and adapted to yield to open said valve for applying brake pressure on said brake piston on the release of said diaphragm spring by retroactive movement of said traction rod.

2. In apparatus for the automatic operation of brakes for drawn vehicles as specified in claim 1, in which said rod is provided with a head bearing against said diaphragm and is movable relatively thereto whereby the diaphragm movement may lag behind temporary retroactive movements of said rod and thereby preventing braking action for such movements of said traction rod.

3. In apparatus for the automatic operation of brakes for drawn vehicles, as specified in claims 1 and 2, in which said spring-pressed valve is provided with a stem in the path of the head of said rod for operating said valve when said rod nears the end of its reëntrant stroke.

4. In apparatus for the automatic operation of brakes for drawn vehicles, as specified in claim 1, in which said cylinders are provided with a liquid supply reservoir, and valve means operable by said piston on its brake release stroke for releasing said supply for replenishing said cylinders with liquid.

In testimony whereof I have signed this specification.

ARTHUR EDOUARD CLÉMENT PARIS.

Witnesses:
  HENRI MONIN,
  CHAS. P. PRESSLY.

Copies of this patent may be obtained for five cents each, by addressing the "Commissioner of Patents, Washington, D. C."